N. MENDENHALL.
Seed Planter.
No. 85,466. Patented Dec. 29, 1868.
2 Sheets—Sheet 1.
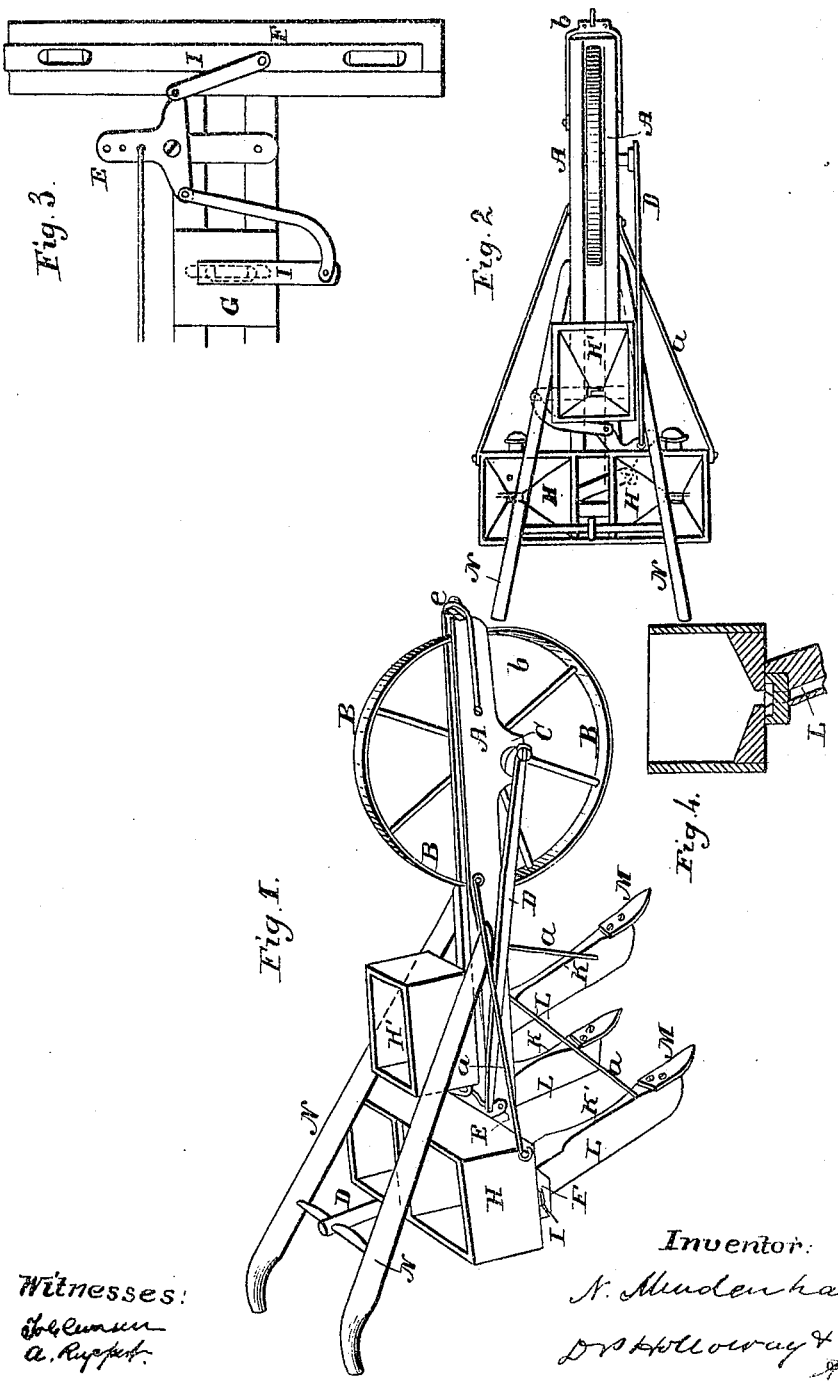

N. MENDENHALL.
Seed Planter.

No. 85,466.

2 Sheets—Sheet 2.

Patented Dec. 29, 1868.

Witnesses:

Inventor:

NOAH MENDENHALL, OF GREENSBURG, INDIANA.

Letters Patent No. 85,466, dated December 29, 1868.

IMPROVEMENT IN CORN AND SEED-PLANTER.

The Schedule referred to in these Letters Patent and making part of the same.

*To all whom it may concern:*

Be it known that I, NOAH MENDENHALL, of the county of Decatur, and State of Indiana, have invented a new and improved Corn and Seed-Planter; and I hereby declare the following to be a full, clear, and exact description thereof, which will enable those skilled in the art to make and use the same, reference being had to the accompanying drawings, making a part of this specification, in which—

Figure 7:
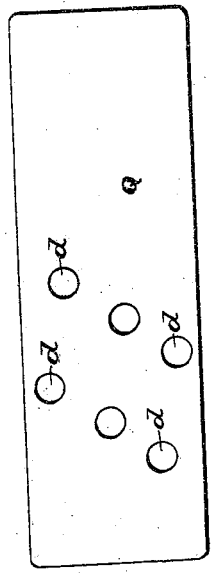
Figure 6:
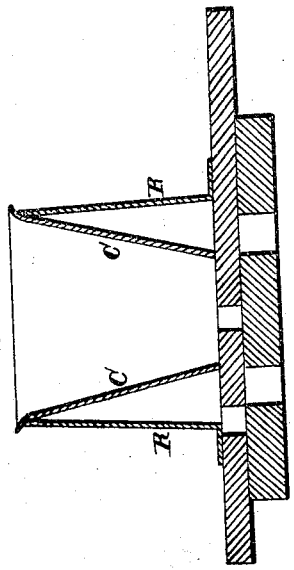
Figure 5:
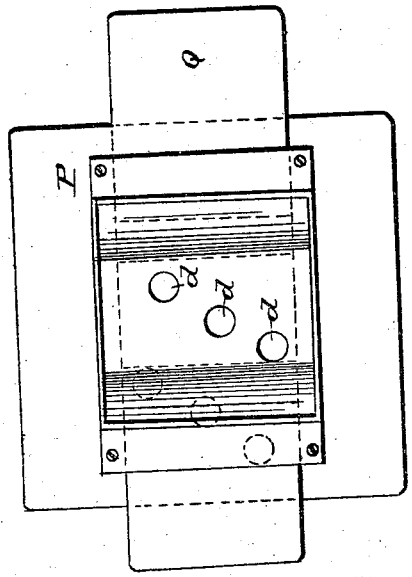

Figure 1 is a perspective view.
Figure 2 is a top view.
Figure 3 is a plan view of the seed-distributers and their gearing, with the seed-boxes removed.
Figure 4 is a sectional side view of seed-box, showing concave bottom.
Figure 5 is a plan view of seed-box used in planting corn.
Figure 6 is a sectional end view of the same, showing slots and seed-distributers.
Figure 7 is a top view of seed-distributer used for dropping corn.

Similar letters of reference indicate corresponding parts.

This invention relates to an improvement in seed-planting machines.

It consists in an improved construction and arrangement of its various parts, as will be fully described.

In the drawings—

A is the beam, composed of two parallel arms, held together at one end by a vertical end-piece and screw; at the other, by the cross-arm F.

B is the wheel, which works within the beam. It has its bearings in its lower edge, at a distance from the end-piece somewhat greater than the semi-diameter of the wheel.

The axle is held in its place by a cap, secured to the beam, in which it has its bearings.

C is a crank, attached to the axle, to work connecting-rod D.

D is the connecting-rod, having a hooked end, which fits into the main arm of the T-piece, that moves the seed-distributers.

E is the T-piece, used to work the seed-distributers.

F is the cross-arm, which serves to unite and steady the arms of the beam. It forms a support for the rear seed-boxes, which are secured to it by bottom screws. On its face are longitudinal grooves, in which the seed-distributers slide. Through it are openings, leading into the seed-tube, and connecting them with the slots of seed-boxes. It carries the rear standards, which are bolted to its front edge.

G is a cap, resting on the beam over the forward standard, containing openings and grooves similar to those on the cross-arms.

H and H' are the seed-boxes, which are square, or of any suitable construction, having concave bottoms formed irregularly, and culminating in a slightly-elongated slot, situated near the rear of H, and near the outer extremities of H'.

I are the seed-distributers.

K K' are the standards. K is carried between the arms of the beam. K' are carried on the cross-arm, as heretofore described.

L are the seed-tubes, having partitioned openings.

M are the shovels.

N are the handles.

O is an upright, fitting into the rear end of the beam, and supporting the cross-piece of the handles.

*a* are the braces.

*b* is the hitching-frame.

P is the seed-box used in planting corn. It is hopper-shaped.

Its bottom is formed by the seed-distributer Q, which slides in a groove on the standard-cap, as described.

R are pyramidical-shaped chambers, formed by the partition C. These chambers facilitate the feeding of the tubes, and the incline of two of the inner walls of the seed-box hastens the deposit of corn on the distributers.

Q is the distributer used in dropping corn.

*d* are its perforations.

From the foregoing description, it is evident that this device can be readily changed into a corn-planter, by removing the forward seed-box and cap, and replacing it by the one shown on sheet 2; that other cross-arms may be attached to a lengthened beam, behind those shown in the drawings, carrying seed-boxes and distributers, fed and operated as the others; that it is very light, and easily managed; that it can be used to drill among standing corn, as well as on clear ground.

The operation of my invention is as follows:

Having filled the boxes with seed, the planter is set in motion. The wheel, by means of the crank, works the connecting-rod, which moves the T-piece, giving a horizontal movement to the distributers in the grooves, passing the grain to and fro, and dropping it on the earth, in rear of the shovels.

Having thus fully described the nature of my invention, and its operation,

I claim—

1. The combination of the crank C, connecting-rod D, T-piece, or cap-arm, E, and seed-distributers I.

2. The combination of the within-described seed-boxes with the distributers and the partitioned seed-tubes, substantially as shown and described.

3. The arrangement of the T-piece E with reference to the seed-distributers, by which they are both moved by one motion of the connecting-rod.

In testimony whereof, I have signed my name to this specification, in the presence of two subscribing witnesses.

NOAH MENDENHALL.

Witnesses:
J. K. EWING,
JOHN J. FOLEY.